July 4, 1933. W. A. SCHMIDT 1,916,337
HEAT INTERCHANGING APPARATUS
Filed Nov. 28, 1931 2 Sheets-Sheet 2

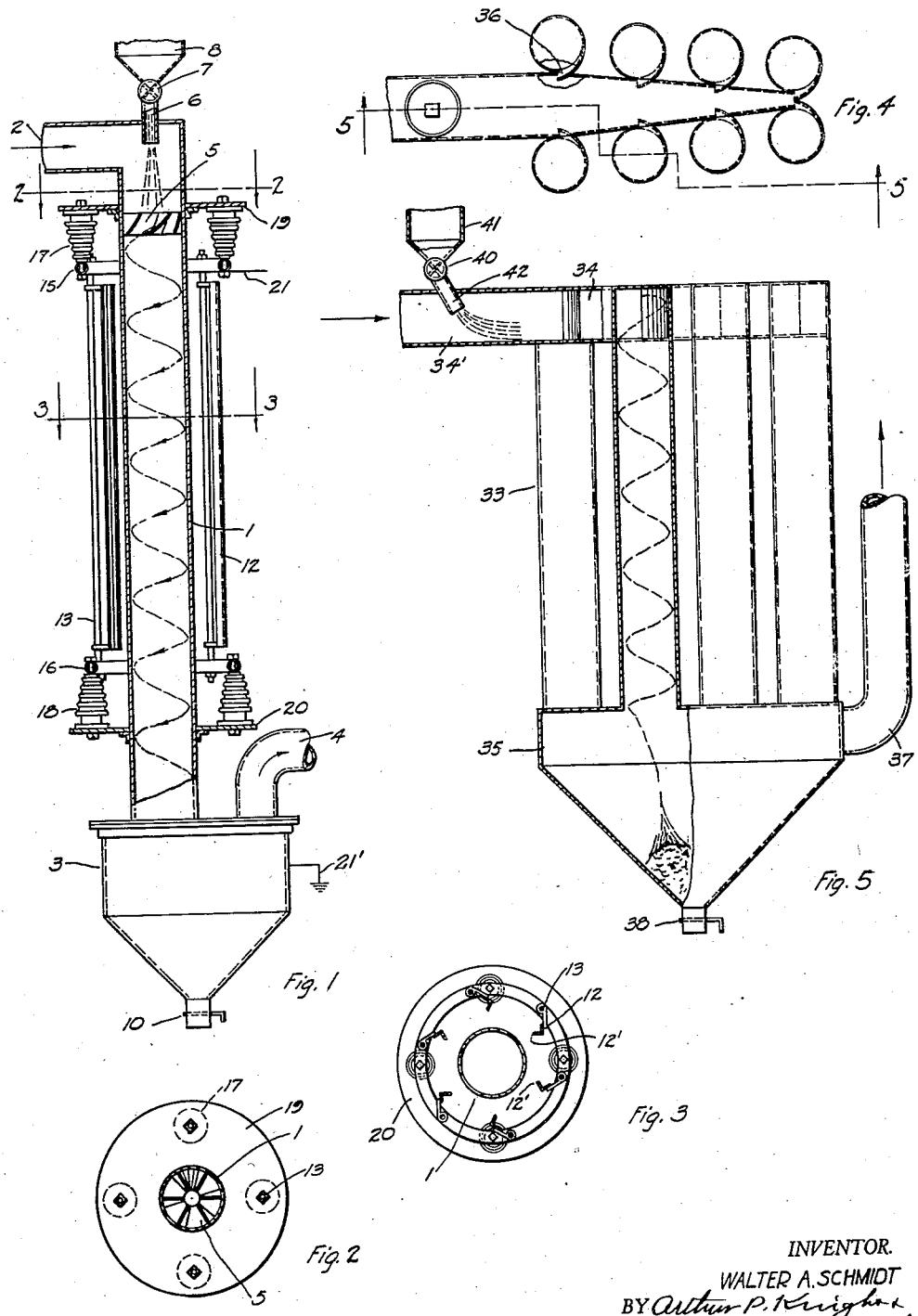

INVENTOR.
WALTER A. SCHMIDT
BY
ATTORNEYS.

Patented July 4, 1933

1,916,337

UNITED STATES PATENT OFFICE

WALTER A. SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA

HEAT INTERCHANGING APPARATUS

Application filed November 28, 1931. Serial No. 577,767.

This invention relates to improvements in heat interchanging apparatus, and the main object of the invention is to increase the heat interchanging capacity of apparatus of this character, particularly when operating with gases containing material which tends to form a heat insulating coating on the heat interchanging walls of such apparatus. Such coating interferes seriously with the efficiency of the heat interchanging operation, and an important object of the invention is to provide means for maintaining the surfaces of such apparatus in clean condition, thereby maintaining the heat interchanging effect at full efficiency.

Another object of the invention is to provide for bringing the gas or fluid which is subjected to the heat interchanging operation into more effective contact or heat interchanging relation with the heat interchanging walls.

The accompanying drawings illustrate the invention, and referring thereto:

Fig. 1 is a vertical section of one form of apparatus suitable for carrying out the invention.

Fig. 2 is a section on line 2—2 in Fig. 1.

Fig. 3 is a section on line 3—3 in Fig. 1.

Fig. 4 is a plan view of another form of the heat interchanging apparatus.

Fig. 5 is a section on line 5—5 in Fig. 4.

Figure 7:
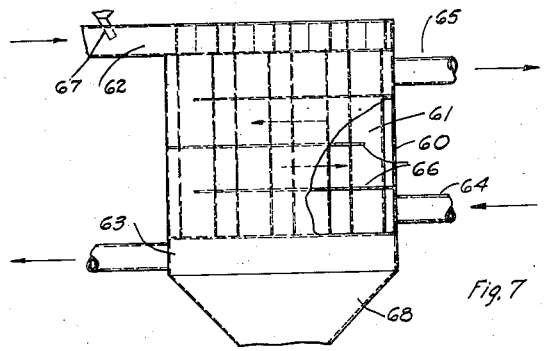
Fig. 7 is a side elevation, partly in section, of a form of heat interchanger especially adapted for utilization of the heating or cooling effect on the medium passing exteriorly of the heat interchanging tubes.

Referring to Figs. 1 to 3, a tubular chamber formed, for example, as a cylindrical pipe 1, is connected at one end to a gas inlet 2, and is provided at the other end with means for carrying away the gas after the heat interchanging operation has been performed thereon. The tubular chamber 1 may be mounted vertically as shown, the gas inlet 2 being connected thereto at the upper end, and the lower end of said tubular chamber being connected to a bin or hopper 3 provided with a gas outlet connection 4.

Means are provided for effecting vortical movement of the gas passing through the tubular chamber 1, said means comprising, for example, helical vanes 5 mounted at the upper portion of said tubular chamber and deflecting the gas entering the tubular chamber so as to impart a tangential component of motion thereto in such manner that the gas follows a sinuous, helical or vortical path in passing downwardly through the tube.

My invention is particularly intended for application in connection with the transfer of heat from or to gases containing material which is of such nature that it tends to form a coating on the wall of the heat interchanging chamber. Such a coating is generally of extremely low heat conductivity as compared to the material of which the wall of the heat interchanging chamber is generally composed, and the resulting resistance to transfer of heat through said wall interferes seriously with the efficiency of the heat interchanging operation. My invention comprises means for continuously or intermittently removing such a coating, and for this purpose I provide means for feeding into the gas stream passing to the heat interchanging chamber 1, finely divided solid material adapted to act as a scouring agent. Said means may comprise a chute 6 opening into the upper end of the tube or chamber 1 and connected through feed means 7 to a bin 8 or other source of supply of finely divided solid material, so as to cause such solid material to be distributed into the current of gas passing from the inlet 2 into the tube 1. The gas, which may be supplied to the apparatus from any suitable source, for example, from a furnace, drier, evaporator, or other means producing an effluent containing material which is liable to form a more or less adherent deposit on the wall of the chamber 1, passes downwardly into said chamber along with the finely divided solid material, and is given a vortical or tangential motion by the operation of the deflecting means 5, with the result that the centrifugal action due to such vortical motion causes the solid suspended material or scouring agent to be thrown outwardly against the cylindrical wall of chamber 1, and by its rapid tangential or helical movement in contact with said wall as indicated by the dotted line, effects the scouring or cleaning action, more or less completely removing from the wall any coating which tends to form thereon. By this means the wall of the heat interchanging chamber 1 may be maintained in effective heat interchanging condition. The scouring action may be effected continuously, if desired, or in some cases the scouring material may be supplied intermittently so as to clean the wall of the chamber 1 from time to time, according to the requirements of the particular case.

The gas passes from the chamber 1 into the bin 3 and out through the outlet 4, the divided solid scouring agent being mainly or wholly collected in the bin 3 and removed through outlet means 10 at the bottom of said bin. The scouring means above referred to may consist of sand or other granular material capable of effecting the scouring action, and such material may be sufficiently coarse to enable substantially all of the same to be deposited in the bin 3 by the action of gravity, and by the effect of the reversal of direction of the gas stream in passing upwardly to the outlet 4. The rapid vortical motion of the gas stream adjacent the wall of the chamber 1, assisted by the presence of the scouring material, also eliminates more or less completely, the heat insulating effect of the stationary gas film which is usually present in immediate contact with the wall of the chamber.

The heat interchanging apparatus will generally be used in withdrawal of heat from hot gases, and in such case the heat absorbing agent is generally the atmospheric air surrounding the apparatus. Any suitable means well known in the art may be employed for increasing the circulation of such cooling gas so as to increase the effective contact of such gas with the wall of the heat interchanging chamber. In some cases this increased circulation may be advantageously effected by the action of electric windage or electrical convection, means for this purpose being shown in Figs. 1 to 3 and comprising discharge electrodes formed as vertical bars 12 mounted to swing on vertical pivot shafts 13 so as to adjust the distance between the discharges edges 12' of said bars and the outside of the tubular chamber 1. The supporting pivot rods 13 are mounted by frames 15 and 16 on insulators 17 and 18 respectively, mounted on supporting means 19 and 20 at top and bottom of the apparatus or in any other suitable manner. The several discharge electrodes 12 are arranged concentrically around the tubular chamber 1 and at such distance apart as to provide for effective electrical convection due to the electric field developed between said electrodes and the wall of the tubular chamber 1.

The discharge electrode system comprising the electrodes 12 and their supporting means is connected by wire 21 to any suitable high tension supply line, for example, an alternating current line of suitable high tension voltage, and the opposing electrode constituted by the tubular chamber 1 is grounded as indicated at 21' so that an electrical field is maintained between the electrodes 12 and the member 1 sufficient to cause silent electrical discharge from the edges of electrodes 12 and resulting electric convection of the air and proximity to the wall of the member 1, the convection currents passing from the discharge electrodes toward said wall and then outwardly away from said wall in the spaces between the electrodes 12. Such convective action largely increases the effective contact between the air surrounding the tubular member 1 and the wall of said tubular member, and correspondingly increases the heat interchanging effect.

If desired, a rectifier may be included in the high tension connection to the discharge electrode system so as to supply rectified or unidirectional current thereto, said rectifier being of any suitable type, for example, a mechanical rectifier, a valve type rectifier, or a solid contact rectifier of the copper oxide type.

In case the volume of gas to be treated is in excess of that which can conveniently be treated in a single pipe or chamber, the construction shown in Figs. 4 and 5 may be used, comprising a plurality of vertical pipes or tubular chambers 33 connected at their upper ends to an inlet header 34 and at their lower ends to a bin 35, the inlet header 34 communicating with the pipes 33 through tangential openings or passages 36 whereby the gas entering the chambers or pipes 33 is given a tangential or vortical motion. The gas outlet pipe 37 leads from the bin 35 and suitable means, such as a gate 38, is provided for discharging the material collected in said bin. The passages 36 are shown as provided with involute curved walls for deflecting the gas tangentially into the respective pipes 33.

Means are provided for feeding solid material to the apparatus, for example, to the inlet header 34, said means consisting for example of an automatic feed means 40 continuously or intermittently feeding divided solid material from a bin 41 to a chute 42 which discharges said material into the gas passing through the inlet 34' to the inlet header 34.

More or less finely divided solid material, such as sand, or other material suitable for effecting a scouring action is supplied by the feeding means aforesaid to the gas entering the inlet header 34 and passing along with the gas into the heat interchanging chambers 33 proceeds downwardly in said chambers with a rapid vortical or whirling motion and the solid material supplied to the gas partakes of such rapid vortical or whirling motion and effectively scours the inner walls of the pipes or chambers 33 with the result that any coating or deposit of material which tends to be deposited on such walls from the gas which is being treated, is scoured and removed by the action of said divided solid material. The solid material used may be sufficiently coarse and heavy to enable it to settle in the bin 35 after the gas has passed through the heat interchanging chambers and may, if desired, be continuously or intermittently returned to the feeding means aforesaid for re-use in the same apparatus. The gas on which the heat interchanging operation has been performed passes out through the outlet 37, and if necessary, any residual scouring material carried thereby may be removed therefrom by suitable separating means.

Figure 6:
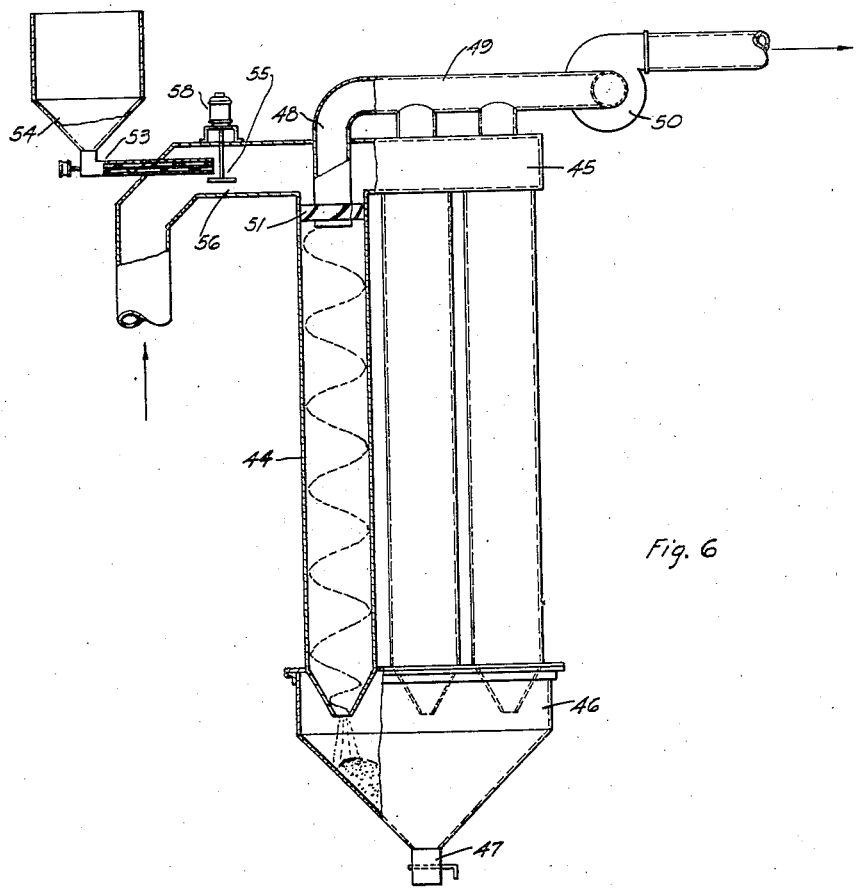
Fig. 6 is a side elevation, partly in section, of a form of heat interchanging apparatus adapted for effecting separation of solid suspended material concurrently with the heat interchanging operation.

In case more effective separating action is required than can be effected by the apparatus above described, the heat interchanging apparatus may be of the cyclone type, such as shown in Fig. 6 comprising, for example, a plurality of separating and heat interchanging tubes or chambers 44 connected at their upper ends to an inlet header 45 and at their lower end to a bin 46 provided with discharge gate 47 for separated material. Outlet tubes 48 are located within the respective tubes or chambers 44 at the upper ends thereof and communicate with an outlet flue 49 leading to suitable means, such as blower 50, for producing the requisite rapid flow of gas through the apparatus. Suitable means such as helical vanes 51 are provided within the respective tubes or chambers 44 adjacent the inlet passages leading from the inlet header 45 to said tubes, so as to cause the gas entering the separator tubes to assume a vortical motion.

Means are provided for supplying divided solid material to the gases passing to the separator tubes, said means comprising, for example, a screw conveyor 53 feeding material from a storage bin 54 to a distributor 55 which operates to disperse such material into the gas flowing through the inlet flue 56 which conducts the gas to be treated to the inlet header 45. Said distributing means is shown as consisting of a disc rotating at high velocity by a motor 58 but the distributing means may be of any suitable construction.

In this form of my invention the gas to bet reated and containing material which would tend to form a coating on the walls of the heat interchanging apparatus, is supplied with sand or other suitable scouring material by the feed means above described and passes into the several heat interchanging tubes or chambers 44 through the inlet passages between the walls of said chambers and the respective outlet tubes 48 and is deflected by the means 51 in said passages, so as to give a vortical motion which causes the suspended solid material in the gases to move rapidly over the inner surface of the tubes or chambers 44, thereby scouring the same and preventing accumulation of heat insulating coating thereon. The vortical motion of the gas tends to throw the suspended solid material close to the wall of the separator chambers and thereby not only assists in the scouring action but causes separation of the solid material from the gases in such manner that the solid material may be substantially wholly removed from the gases and be collected in the bin 46, while the clean gas passes out through the outlets 48.

In any of the above described forms of the invention withdrawal of heat from the heat interchanging walls or the supply of heat thereto, as the case may be, at the outside thereof, may be effected in any suitable manner, for example, by radiation and/or conduction through the surrounding atmosphere or by means of a fluid, either liquid or gaseous, circulated in contact with the heat interchanging chambers or by any other suitable means. The transmission of heat to or from the heat interchanging walls may, if desired, be assisted by electric convection by means of the apparatus shown in Figs. 1 to 3, but it will be understood that my invention is not limited to the use of such apparatus. In case such electric convection is utilized, the fluid medium used for heat interchanging must be of an insulating nature, and it may be either atmospheric air or other gas, or an insulating liquid.

In case the apparatus is to be used for heating or cooling a fluid passed in contact with the outside of the heat interchanging chambers, such fluid may as shown in Fig. 7 be passed through a chamber in casing 60 inclosing the heat interchanging pipes 61 which are connected to inlet and outlet headers 62 and 63 as above described, said casing being provided with inlet means 64 and outlet means 65 for circulating therethrough the fluid (either liquid or gaseous) to be heated or cooled. Suitable baffle means 66 may be provided for guiding the fluid in a tortuous path to cause effective contact of same with the heat interchanging pipes. Means indicated at 67 are provided for supplying divided solid scouring material to the gas passing to the heat interchanging pipes, and a bin or hopper 68 may be provided for collecting and removing such material after the gas has passed through the pipes, suitable means such as tangential inlets 69 being provided for imparting vortcal motion to the gas passing through the pipes 61, so as to effect the scouring action above described and also assist in separation of the scouring materials from the gas.

I claim:

1. The method of performing a heat interchanging operation upon a gas containing material which tends to form a deposit upon the heat interchanging surfaces, which consists in supplying to such gas a divided solid scouring agent, causing the gas together with the scouring agent carried thereby to move in contact with a heat interchanging surface with sufficient velocity to remove therefrom material deposited thereon from the gas, and maintaining said surface at a temperature different than that of said gas.

2. The method of performing a heat interchanging operation upon a gas containing material tending to deposit a coating on the heat interchanging surfaces, which consists in supplying divided solid scouring material to such gas imparting rapid vortical motion to the gas while causing the same to move in contact with a heat interchanging surface in such manner as to bring the solid material by centrifugal action into effective scouring contact with the heat interchanging surface, so as to maintain such surface free of deposited coating and maintaining said surface at a temperature different than that of said gas.

3. Apparatus for heat interchanging comprising a heat interchanging chamber provided with gas inlet and gas outlet means, and means supplying divided solid scouring material to the gas entering said chamber in such manner as to cause said scouring material to be carried by the gas stream into scouring contact with the walls of said chamber, and means for maintaining said walls at a temperature different than that of the gas delivered through said inlet means.

4. A heat interchanging apparatus comprising a heat interchanging chamber provided with a gas inlet and a gas outlet means, said gas inlet means being constructed and adapted to produce vortical motion of the gas within said chamber, means for supplying divided solid scouring material to the gas entering said chamber in such manner as to cause said scouring material to be carried by the gas stream into scouring contact with the walls of said chamber, and means for maintaining said walls at such temperature as to effect heat interchange between said walls and the gas within said chamber.

5. A construction as set forth in claim 4 and comprising, in addition, means for separating the divided solid scouring material from the gas.

6. The method of performing a heat interchanging operation, which comprises maintaining a heat interchanging insulating fluid in contact with heat interchanging surface, maintaining said surface at a temperature different than that of said fluid, and producing convection currents in said fluid by the action of an electrostatic field, in such manner as to increase the heat interchanging effect between said fluid and the heat interchanging surface.

7. The method of performing a heat interchanging operation, which comprises passing a gas in contact with one side of a heat interchanging wall, maintaining a heat interchanging insulating fluid, at a temperature different than that of said gas, in contact with the other side of said wall, and producing convection currents in said fluid by the action of an electrostatic field, in such manner as to increase the rate of heat interchange between said fluid and said wall.

8. The method of performing a heat interchanging operation upon a gas containing material which tends to form a deposit upon heat interchanging surfaces, which consists in supplying to such gas a divided solid scouring material, causing the gas together with the scouring agent carried thereby to move in contact with one side of a heat interchanging wall with sufficient velocity to remove from said wall material deposited thereon from the gas, by the scouring action of said material, maintaining a heat interchanging insulating fluid at a temperature different than that of said gas in contact with the other side of said wall, and producing convection currents in said fluid by the action of an electrostatic field, in such manner as to increase the heat interchanging effect between said fluid and said wall.

9. A heat interchanging apparatus comprising a wall, one side of which is exposed to contact with an insulating fluid adjacent the same, means for passing a gas at a temperature different than that of said fluid in contact with the other side of said wall, electrode means spaced from said one side of the wall and separated therefrom by said insulating fluid, and means for maintaining a high potential difference between said electrode means and said wall so as to produce electrical convection in said fluid between said electrode means and said wall.

10. A heat interchanging apparatus comprising a heat interchanging chamber having a wall, the exterior of said wall being exposed to contact with the atmosphere surrounding the same, means for passing a gas at a temperature different than that of said atmosphere through said chamber and in contact with the interior of said wall, electrode means mounted adjacent and spaced from the exterior of said wall, and means for maintaining a high potential difference between said electrode means and said wall so as to produce electrical convection in the atmosphere therebetween.

11. A heat interchanging apparatus comprising a heat interchanging wall, means for passing a gas in contact with said wall, means for supplying divided solid scouring material to said gas in such manner as to cause said scouring material to be carried by said gas into scouring contact with said wall, and means for maintaining said wall at a temperature different than that of said gas.

12. A heat interchanging apparatus comprising a heat interchanging wall, one side of which is exposed to contact with a heat interchanging insulating fluid adjacent said wall, means for passing a gas at a temperature different than that of said fluid in contact with the other side of said wall, means for supplying divided solid scouring material to said gas in such manner as to cause said scouring material to be carried by the gas into scouring contact with said other side of the wall, electrode means spaced from said one side of the wall and separated therefrom by said insulating fluid, and means for maintaining a high potential difference between said electrode means and said wall, so as to produce electrical convection in said fluid between said electrode means and said wall.

In testimony whereof I have hereunto subscribed my name this 23rd day of November 1931.

WALTER A. SCHMIDT.